United States Patent
Bories et al.

(10) Patent No.: US 6,778,841 B1
(45) Date of Patent: Aug. 17, 2004

(54) METHOD AND APPARATUS FOR EASY INPUT IDENTIFICATION

(75) Inventors: Jolynn Bories, San Diego, CA (US); Justin Beghtol, Huntington Beach, CA (US)

(73) Assignee: Nokia Corporation, Irving, TX (US)

( * ) Notice: Subject to any disclaimer, the term of this patent is extended or adjusted under 35 U.S.C. 154(b) by 0 days.

(21) Appl. No.: 09/465,686

(22) Filed: Dec. 17, 1999

(51) Int. Cl.[7] .................................................. H04M 1/00

(52) U.S. Cl. ...................... 455/550; 455/464; 455/422.1

(58) Field of Search ................................ 455/550, 422.1, 455/556.1, 464, 557, 558, 575.1, 566; 379/52, 433.12; 340/825.56; 341/34, 22; 345/810, 902

(56) References Cited

U.S. PATENT DOCUMENTS

| | | | |
|---|---|---|---|
| 5,311,175 A | | 5/1994 | Waldman |
| 5,557,671 A | | 9/1996 | Endoh |
| 5,754,645 A | * | 5/1998 | Metroka et al. ....... 379/433.12 |
| 5,923,267 A | | 7/1999 | Kip et al. |
| 6,173,194 B1 | * | 1/2001 | Vanttila ....................... 455/566 |
| 6,477,390 B1 | * | 11/2002 | Gum et al. .................. 455/550 |

* cited by examiner

*Primary Examiner*—Nick Corsaro
*Assistant Examiner*—Alan T. Gantt
(74) *Attorney, Agent, or Firm*—Gary Savitt; Tom Weber

(57) ABSTRACT

The present invention comprises a method and apparatus, which provides feedback for identification of a selected input on an electronic device. The method and apparatus is provided for identifying selected inputs of a device by a user of the device before the selected input is accepted as input for further processing in the device.

21 Claims, 4 Drawing Sheets

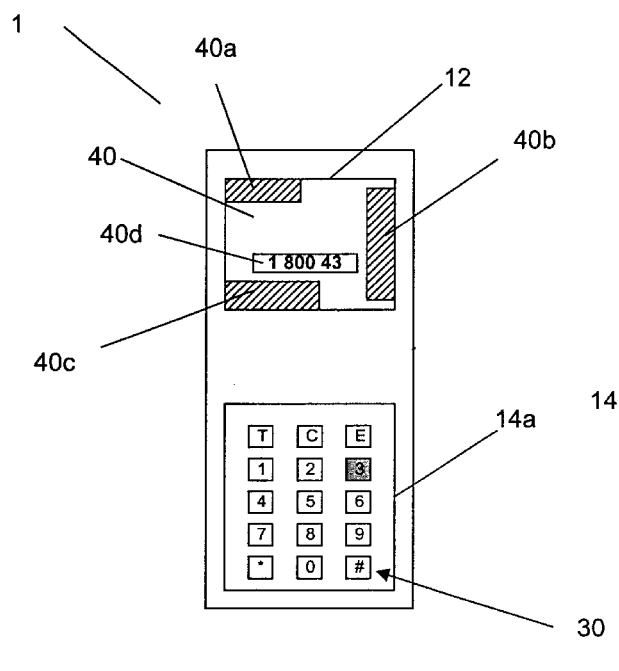
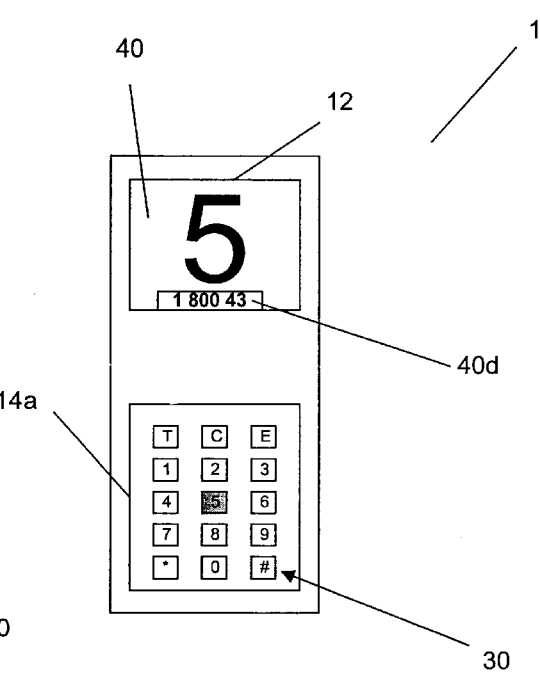
FIG 4aFIG 4b

METHOD AND APPARATUS FOR EASY INPUT IDENTIFICATION

FIELD OF INVENTION

This invention relates generally to electronic devices and, more particularly, to electronic devices that have input devices for entering device inputs, and a method and apparatus for device input identification and acceptance in electronic devices.

BACKGROUND OF THE INVENTION

Mobile stations (also referred to as a radiotelephones, mobile devices, mobile transceivers, mobile telephones, mobile terminals, etc.) have become a widespread convenient means of communication around the world. Mobile telephones, for example, have proliferated globally and can be seen in virtually any area of the world.

Since the inception of mobile phones, manufacturers have been pressured to reduce the size of the mobile phones to increase portability, and concurrently increase the size of the Liquid Crystal Display (LCD) to meet more sophisticated display requirements. To meet these requirements, the manufacturers in designing mobile phones attempt to reduce the area occupied by the keypad while increasing the size of the LCD to provide a larger display area. Consequently, most manufacturers of phones design and build phones with a large LCD and with small keys on a keypad.

Mobile phones having small keys and a large LCD are very convenient for providing both portability and ease of use in reading and composing e-mails and browsing the Internet. The larger LCD is also convenient for displaying digital images such as video or still photographs. However, a mobile phone .having small keys also provides greater difficulties in identifying the keys. Small keys on mobile phones may make it difficult to identify which key is selected for input. If the user is not able to identify which key is selected, there is greater chance that an incorrect key input will be entered for processing. When an incorrect key input is entered, the user must clear the entry to correct the error. However, for example, when entering data during an established call, corrections may not be possible and the user may be required to re-establish the call and start over. These minor errors, which occur due to lack of key identification prior to selecting the key, can be inefficient and costly. Therefore, a method of identifying which key is selected before accepting it for processing would be useful.

SUMMARY OF INVENTION

The present invention comprises a method and apparatus for providing feedback for identification of a selected key to a user of a mobile device. The method and apparatus is provided for identifying selected keys of a mobile before the selected key is accepted as input for processing in the mobile device.

In an embodiment of the invention, an electronic device provides feedback of a selected input, a key press for example, such that the user may make a proper decision about accepting the selected input. First, the device determines the input selected by the user. Next, based on the type of feedback selected by the user or implemented by the manufacturer, a feedback is generated. For example in visual feedback using an LCD, the selected input may be displayed on the LCD. Next, a determination is made as to whether the selected input is accepted by the user. If the selected input is accepted, then the function associated with the input is processed. For example, a number may be entered into the device as part of a number to be dialed.

One advantage of this invention is that a user of an electronic device is able receive a feedback, visual for example, of the selected input before accepting that selected input. This invention may provide an advantage for users with limited eyesight. The selected input may be displayed using the display area of the LCD in an enhanced mode wherein the display is larger and/or brighter, thereby further assisting users with limited eyesight or users who are in low light conditions. In alternatives of the embodiment using the enhanced mode, a user may increase or decrease the level, for example, text size or brightness, of feedback. This feedback provided prior to acceptance of a key may save users time and frustration of clearing and/or re-entering the desired key.

The feedback may be any type generated in the mobile phone devices that provides information on the selected input to the user. For example, the feedback may be audio, for example, a signal generated by a tone generator. The audio feedback may assist visually impaired users by generating identifiable audio tones of the selected input. The audio feedback may also comprise an enhanced mode for generating louder audio tones. In alternatives of the embodiment using the enhanced mode, a user may increase or decrease the level or volume of feedback.

In another embodiment of the invention, a keypad is provided to input data to control a processor. The keypad comprises a plurality of keys, each key comprising at least two contacts that are coupled to the processor. The first contact closes a first circuit thereby allowing the processor to determine the type of input and to provide a feedback of the input. A second contact closes a second circuit thereby allowing the processor to accept the input and process the functions associated with input.

In yet another embodiment of the invention, a processor is coupled to a timer for determining if the selected input should be accepted. Whenever any input is selected, a counter is activated. If the selected input is selected continuously for a predetermined time, the processor accepts the input and processes the function associated with the selected input.

In a further embodiment of the invention, the feedback is a combination of audio and visual, wherein the audio may be voice or tones and the visual may be a display on the LCD or graphics on any other type of display.

BRIEF DESCRIPTION OF THE DRAWINGS

Other advantages will be readily appreciated, as the invention becomes better understood by reference to the following detailed description and the accompanying drawings.

FIGS. 4a–b illustrate an embodiment of the invention that may be utilized in operation of the mobile phone of FIG. 1.

DETAILED DESCRIPTION OF THE INVENTION

Figure 1:
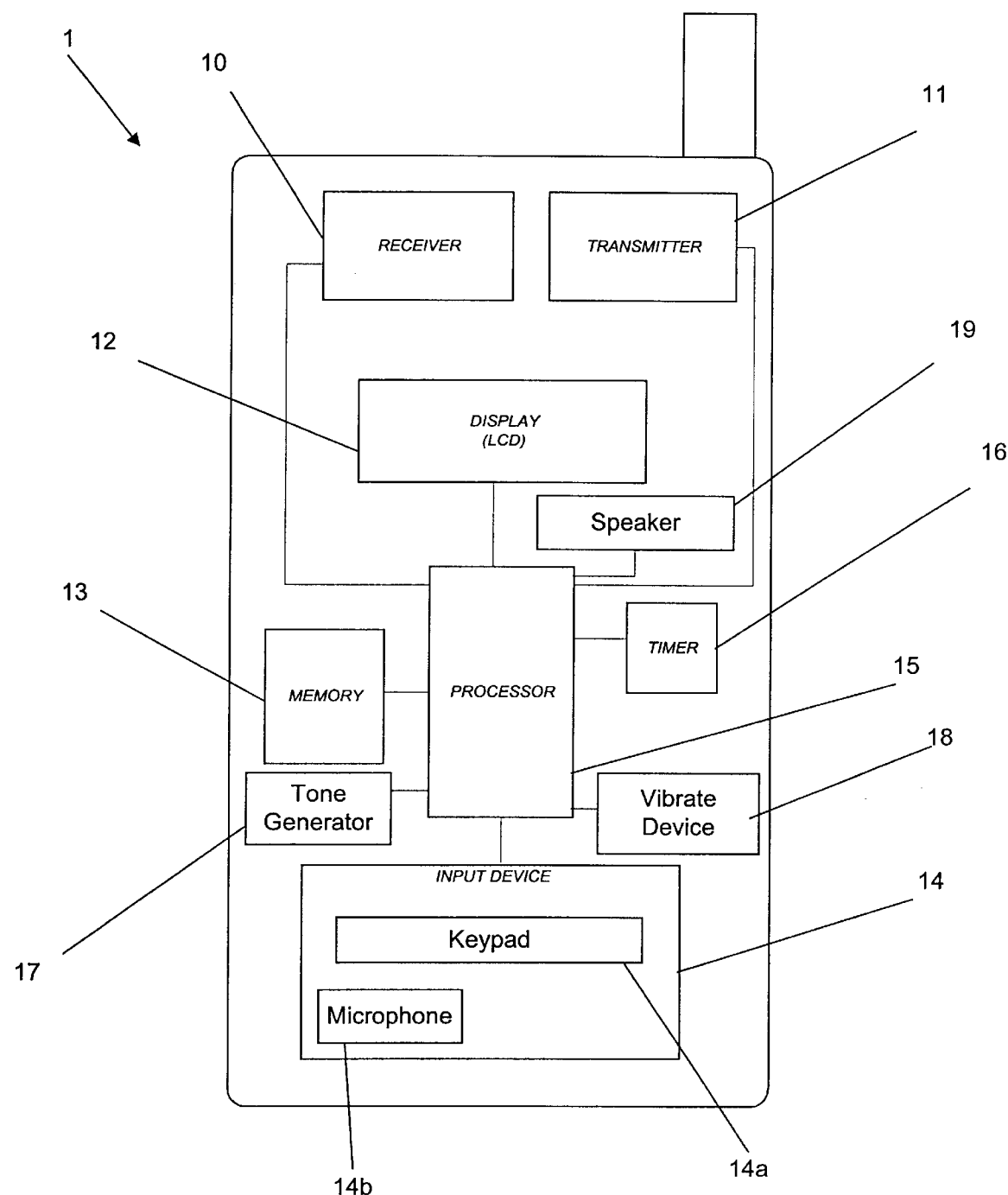
FIG. 1 is a block diagram of a mobile phone according to an embodiment of the invention.

FIG. 1 is a block diagram of a mobile phone 1 according to an embodiment of the invention. Generally, mobile phone 1 includes receiver 10, transmitter 11, and controller (which may also be known as a processor) 15 that is coupled to transmitter 11 and receiver 10. Processor 15 initiates the transmission of outgoing signals and processes incoming signals. These signals may include signaling information in accordance with the air interface of the applicable cellular or digital system, and also user speech and/or user generated data.

A user interface includes a Liquid Crystal Display (LCD) 12, tone generator 17, speaker 19, vibrate device 18 and user input device 14 comprising keypad 14a, all of which are coupled to processor 15. The input device may also comprise microphone 14b for generating input. Mobile phone 1 also comprises timer 16 (also referred to as a clock chip) coupled to processor 15 for synchronizing the operations of processor 15 and tracking time.

Mobile phone 1 also includes various memories, shown collectively as memory 13. Memory 13 includes a plurality of stored constants and variables that are used by processor 15 during the operation of mobile phone 1. For example, memory 13 stores the values of the various feature parameters and the number assignment module (NAM). An operating program for controlling the operation of processor 15 is also stored in memory 13 (typically in a read only memory). Memory 13 is also used to store data provided by the user through the user interface. Furthermore, memory 13 is used to hold the subprograms or sub-processes for controlling the operation of mobile phone 1 and carrying out the embodiment of the invention.

In accordance with an aspect of the embodiment of the invention, the operating program in memory 13 includes a routine to allow the user to set up one or more function settings to control the type of feedback. Using the menu function, the user is able to select one or more types of feedback to receive for a selected input. The types of feedback comprise visual, audio and vibratory and may be provided in normal or enhanced mode. Enhanced mode provides an easily determinable feedback, such as using a bigger text display than normal display mode. The visual feedback may be displayed on an LCD as for example, a graphical or a video display. The audio feedback may be provided by voice or by tone. Yet another type of feedback may be by vibration. It should be realized that a combination of visual, audio and vibratory feedback is within the scope of the invention. It should also be realized that other types of feedback are within the scope of the invention.

Figure 2:
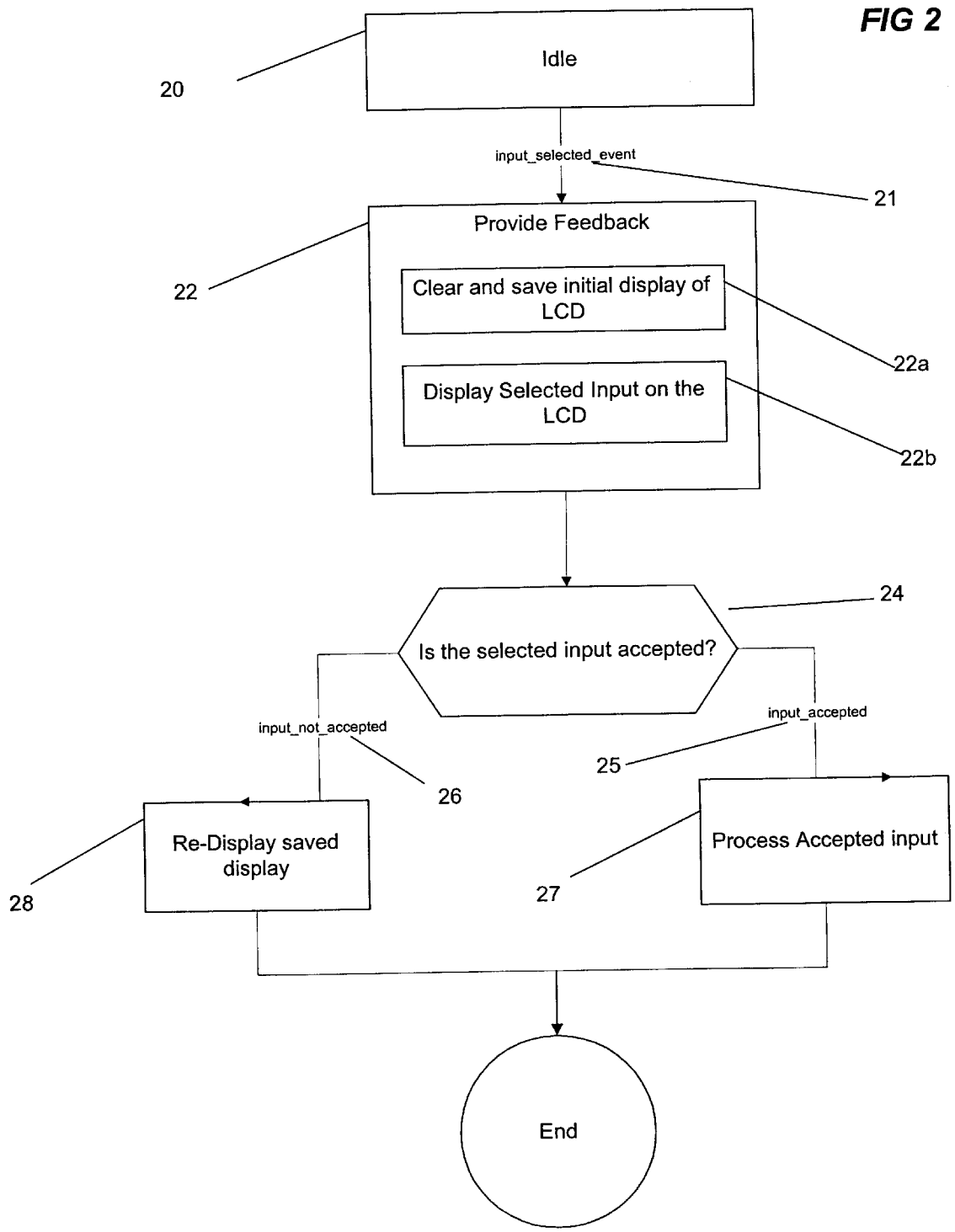
FIG. 2 is a flow diagram that illustrates the input selection task executed by the mobile phone of FIG. 1.

Reference is made to FIG. 2 for illustrating an input selection task in accordance with an embodiment of this invention. At block 20, the task is shown as being in idle state. In this state, no input has currently been provided to processor 15 using the input device 14. When input is provided, such as pressing a key of keypad 14a, an input_selected event 21 is generated. The input_selected event 21 causes the input task to process and provide a feedback at block 22. The feedback may be a visual display. Sub-blocks 22a and 22b of block 22 illustrate tasks for a visual display upon a key press. At block 22a, the current display is saved and cleared upon a key press. Next, at block 22b, the selected key is displayed for acceptance. Next, at block 24, a determination is made on whether the selected key is accepted by the user. If the selected key is accepted, then an input_accepted event 25 is generated, and block 27 is processed. At block 27, depending of the function associated with the input, that input is processed. Otherwise, an input_not_accepted event 26 is generated, and block 28 is processed. At block 29, the selected key is no longer displayed on the LCD, and the LCD is restored to a standard display and the input selection task is set to idle state, as shown in FIG. 4a. The user may indicate selected key acceptance at block 24 by various methods.

In the embodiment of the invention, at block 24, a counter variable is provided in the memory to provide selected key acceptance. The counter variable is used in conjunction with the timer 16 to determine if the selected input was accepted. If the selected input is continuously selected, for example, the selected key is continuously pressed according to predetermined conditions, then the processor 15 generates the input_accepted event 25. Otherwise, the processor generates the input_not_accepted event 26. For example, when a key is selected, the counter, which may be set to a predetermined time, is decreased to zero. If the counter reaches zero while the key is still pressed, then the input_accepted event 25 is generated. Otherwise, the input_not_accepted event 26 is generated. If the input_accepted event 25 is generated, at block 27 the accepted key is processed as input. Otherwise, if input_not_accepted event 26 is generated, at block 28 the display saved at block 22a is re-displayed, and the not accepted input is not processed.

Figure 3A:
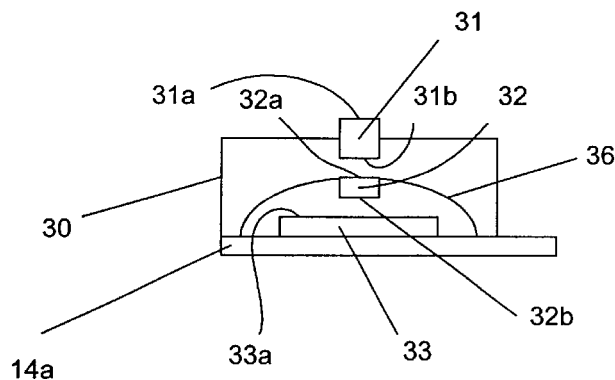
FIGS. 3a–c are side views of a key and operation of the key used as an input device of mobile phone of FIG. 1.
Figure 3B:
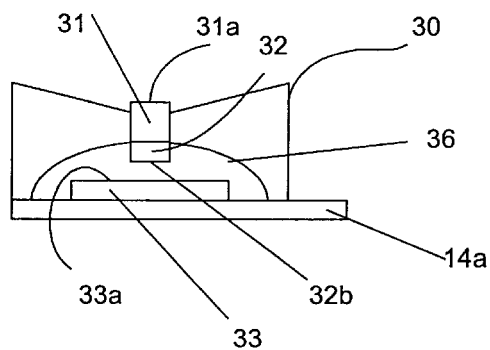
Figure 3C:
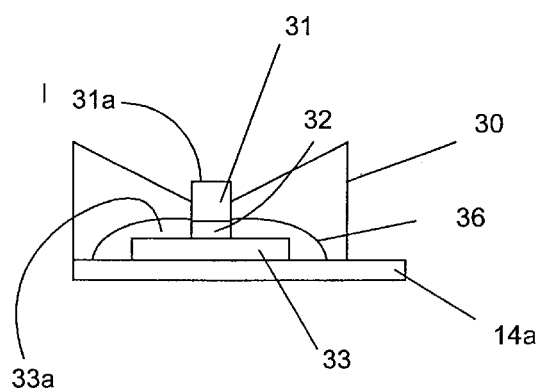

In an alternative of the embodiment, keypad 14a may comprise a plurality of keys configured to provide selected key acceptance. Operation and components of an example key 30 are illustrated in FIGS. 3a–3c. Each key 30 comprises at least two distinguishable contact points 31 and 32. Each key 30 further comprises at least two contact surfaces 32a and 33a. The contact surfaces are coupled to the processor for generating events for the input selection task shown in FIG. 2. First contact point 31 comprises a top surface 31a and first bottom surface 31b, wherein the first bottom surface 31b communicates with first contact surface 32a. Second contact point 32 comprises first contact surface 32a and second bottom surface 32b, wherein second bottom surface 32b communicates with second contact surface 33a. When first bottom surface 31b communicates with first contact surface 32a, at block 20 of FIG. 2, the input_selected event 21 is generated. As shown in FIG, 3b, the pressing of key 30 by the user initiates the contact between first bottom surface 31b and first contact surface 32a. While the first bottom surface 31b and first contact 32a are in contact, further pressing of key 30, as shown is FIG, 3c, may initiate the contact between second bottom surface 32b and second contact surface 33a, causing, at block 24 of FIG. 2, the input_accepted event 25 to be generated. If the contact between first bottom surface 31b and first contact surface 32a is interrupted before second bottom surface 32b contacts second contact surface 33a, then the input_not_accepted event 26 is generated at block 24 of FIG. 2. A flexible dome 36 may be provided to control movement and contact of surfaces 32a and 33a and bottom surfaces 31b and 32b of the key. In order to allow various degrees of user control of the keys, the dimensions of the parts illustrated in FIG. 3a may be varied.

FIGS. 4a and 4b illustrate a possible implementation of display 12 and keypad 14a of mobile device 1. Display 12 includes an LCD having a display area 40. The display area 40 is divided into several information displays areas 40a–40d. For example, information area 40d may be used to display a series of numbers already entered by the user and accepted by the processor 15. Keypad 14a comprises a plurality of keys for entering data. FIG. 4a illustrates keypad 14a and display 12 in an idle state of the input selection task of FIG. 2. FIG. 4b illustrates the feedback process of block 22b of FIG. 2. As illustrated in FIG. 4b, when a user selects a key, which may be configured as key 30 of FIG. 3a, for example. the "5" key, processor 15 displays "5" using an enhanced or a larger area of display 12. This allows the user to identify the selected input before accepting it. The processor 15 displays the selected input, "5" for example, when the first bottom surface 31*b* of the first contact point 31 communicates with the first contact surface 32*a* of the second contact point 32 to make a first contact as shown in FIG. 3*b*. If the user continues pressing the selected key, bottom surface 32*b* of contact point 32 contacts contact surface 33*a* of contact point 33 in a second contact to indicate acceptance of the selected key.

It should be realized that it is within the scope of the invention to provide alternative visual feedback, such as a graphical or a video display. It should also be realized that it is within the scope of the invention to provide routines that allow the user to select, manipulate or combine the type of feedback based on preference.

Thus, while the invention has been particularly shown and described with respect to preferred embodiments thereof, it will be understood by those skilled in the art that changes in form and detail may be made therein without departing from the scope and spirit of the invention.

What is claimed is:

1. A method for identifying selected input of an electronic device, comprising the steps of:

generating a first event when the input is selected; said first event receiving the input from a keypad having a plurality of keys, each key having a contact point and a contact surface, and generating the first event when the contact point contacts the contact surface;

providing, in response to the first event, a feedback of the selected input prior to accepting the selected input;

generating a second event if the selected input is accepted; and processing the selected input if the second event is generated.

2. A method as set forth in claim 1, wherein the step of providing a feedback comprises the step of visually displaying the selected input.

3. A method as set forth in claim 1, wherein the step of providing a feedback comprises the step of generating an audio display.

4. A method as set forth in claim 1, wherein the step of generating the second event comprises decreasing a counter started in response to the first event, and generating the second event if the counter reaches zero while the input is continuously selected.

5. A method as set forth in claim 1, wherein the step of generating the second event comprises incrementing a counter started in response to the first event, and generating the second event if the counter reaches a predetermined time while the input is continuously selected.

6. A method as set forth in claim 1, wherein the contact point comprises a first contact point and the contact surface comprises a first contact surface, wherein each of said plurality of keys further comprises a second contact point and a second contact surface; and wherein said step of generating the second event if the second contact point contacts the second contact surface.

7. A method as set forth in claim 2, further comprises a step of removing the feedback from the display if the second event is not generated.

8. An apparatus for identifying a selected input on an electronic device, said apparatus comprising:

an input device for receiving the selected input, the input device comprises a keypad, said keypad comprising a plurality of keys, each said keys comprising at least two contacts, a controller coupled to said input device, said controller for providing a feedback of the selected input before accepting the selected input, said at least two contacts coupled to said controller, wherein a first contact of said at least two contacts provides a signal to said controller indicating that the input device has received the selected input and a second contact of said at least two contacts provides a signal to said controller indicating that the selected input is accepted; and determining if the selected input is accepted and, in response to a positive determination, accepting the selected input.

9. An apparatus as claimed in claim 8, wherein the apparatus comprises a visual display coupled to the controller, and wherein the controller provides the feedback through the visual display.

10. An apparatus as claimed in claim 9, wherein the visual display comprises a LCD having a mode for enhanced display and the controller provides the feedback of the selected input using the mode for enhanced display.

11. An apparatus as claimed in claim 8, wherein the apparatus further comprises an audio display coupled to the controller, said audio display comprising a tone generator for generating tones based on the selected input, and wherein the controller provides the feedback through the audio display.

12. A method of entering input to an electronic device, said method comprising the steps of:

receiving an input at a keypad input device of the electronic device; in response to receiving an input at the device providing, in the display, an indication in a normal mode, then;

providing an indication of said input, in an enhanced mode, to a user of the electronic device before processing the input in the electronic device;

determining whether the user has accepted the input; and, in response to a positive determination in said step of determining;

processing the input in the electronic device.

13. The method of claim 12, wherein said step of receiving an input comprises detecting that a key has been depressed and wherein said step of determining whether the user has accepted the input comprises determining that said key has been depressed for a predetermined period of time.

14. The method of claim 12, wherein said step of receiving an input comprises detecting that a key has been depressed so that a first contact has been made, and wherein said step of determining whether the user has accepted the input comprises determining that said key has been depressed so that a second contact has been made.

15. The method of claim 12, wherein said step of providing an indication comprises the step of providing an audio indication of said input to the user.

16. The method of claim 15, wherein said step of receiving an input comprises detecting that a key has been depressed, and wherein said step of determining whether the user has accepted the input comprises determining that said key has been depressed for a predetermined period of time.

17. The method of claim 15, wherein said step of receiving an input comprises detecting that a key has been depressed so that a first contact has been made, and wherein said step of determining whether the user has accepted the input comprises determining that said key has been depressed so that a second contact has been made.

18. A method of entering input to an electronic device, said method comprising the steps of:

receiving an input at an input device of the electronic device, wherein said step of receiving the input comprises detecting that a key has been depressed;

providing an indication of said input to a user of the electronic device before processing the input in the electronic device;

determining whether the user has accepted the input; and wherein said step of determining whether the user has accepted the input comprises determining that said key has been depressed for a predetermined period of time, and, in response to a positive determination in said step of determining, processing the input in the electronic device.

19. The method of claim 18, wherein said step of providing an indication comprising the step of providing an indication of said input to the user in an enhanced mode.

20. A method of entering input to an electronic device, said method comprising the steps of:

receiving an input at an input device of the electronic device, wherein said step of receiving an input comprises detecting that a key has been depressed so that a first contact has been made,;

providing an indication of said input to a user of the electronic device before processing the input in the electronic device;

determining whether the user has accepted the input; and wherein said step of determining whether the user has accepted the input comprises determining that said key has been depressed so that a second contact has been made and, in response to a positive determination in said step of determining; processing the input in the electronic device.

21. The method of claim 20, wherein said step of providing an indication comprising the step of providing an indication of said input to the user in an enhanced mode.

* * * * *